US011772558B2

(12) United States Patent
Ambrosi

(10) Patent No.: US 11,772,558 B2
(45) Date of Patent: Oct. 3, 2023

(54) SUPPORT FOR CONNECTING A REAR-VIEW MIRROR TO A CORRESPONDING VEHICLE

(71) Applicant: S.M.A.T. NORD S.R.L., Turin (IT)

(72) Inventor: Gianfranco Ambrosi, Almese (IT)

(73) Assignee: S.M.A.T. NORD S.R.L., Turin (IT)

( * ) Notice: Subject to any disclaimer, the term of this patent is extended or adjusted under 35 U.S.C. 154(b) by 137 days.

(21) Appl. No.: 17/259,756

(22) PCT Filed: Feb. 12, 2019

(86) PCT No.: PCT/IB2019/051110
§ 371 (c)(1),
(2) Date: Jan. 12, 2021

(87) PCT Pub. No.: WO2020/012251
PCT Pub. Date: Jan. 16, 2020

(65) Prior Publication Data
US 2021/0178972 A1    Jun. 17, 2021

(30) Foreign Application Priority Data
Jul. 13, 2018  (IT) .................. 102018000007201

(51) Int. Cl.
*B60R 1/06* (2006.01)
(52) U.S. Cl.
CPC .............. *B60R 1/06* (2013.01); *B60R 1/0602* (2013.01)
(58) Field of Classification Search
CPC .................................. B60R 1/06; B60R 1/0602
See application file for complete search history.

(56) References Cited

U.S. PATENT DOCUMENTS 5,513,048 A * 4/1996 Chen ....................... B60R 1/078
359/872
6,116,743 A    9/2000 Hoek
(Continued)

FOREIGN PATENT DOCUMENTS

EP    3366519 A1   8/2018
JP    2014512308 A  5/2014

OTHER PUBLICATIONS

International Search Report and Written Opinion dated Apr. 16, 2019 from counterpart International Application No. PCT/IB2019/051110.
(Continued)

*Primary Examiner* — Eret C McNichols
(74) *Attorney, Agent, or Firm* — SHUTTLEWORTH & INGERSOLL, PLC; Timothy Klima

(57) ABSTRACT

A support for connecting a rear-view mirror to a vehicle, including on vehicles suitable for towing a trailer, includes a connecting device to the vehicle, a supporting device of the rear-view mirror, and a device to movably connect the supporting device to the vehicle, which connecting deice allows the supporting device to be moved to any position between a respective retracted position, with respect to the connection device, particularly in which the rear-view mirror is nearest to the vehicle, and a respective extended position, with respect to the same connecting device, particularly in which the same rear-view mirror is furthest from the same vehicle, wherein the connecting device has a plurality of pairs of surfaces for a slidable engagement to corresponding pairs of surfaces of the connecting device.

8 Claims, 10 Drawing Sheets

(56) References Cited

U.S. PATENT DOCUMENTS

| | | | |
|---|---|---|---|
| 6,871,970 B2* | 3/2005 | Georges | B60R 1/0612 |
| | | | 359/841 |
| 7,267,449 B1 | 9/2007 | Boddy et al. | |
| 7,594,731 B2* | 9/2009 | Sinelli | B60R 1/025 |
| | | | 359/872 |
| 9,333,918 B2* | 5/2016 | Lang | B60R 1/06 |
| 9,751,466 B2* | 9/2017 | Huang | B60R 1/081 |
| 9,969,333 B2* | 5/2018 | Ervin | B60R 1/078 |
| 11,472,342 B2* | 10/2022 | Miles | B60R 1/078 |
| 2003/0202263 A1 | 10/2003 | Georges | |
| 2008/0310041 A1 | 12/2008 | Sinelli et al. | |
| 2009/0080096 A1* | 3/2009 | Fimeri | B60R 1/074 |
| | | | 359/841 |
| 2014/0111879 A1 | 4/2014 | Lang et al. | |
| 2017/0327040 A1 | 11/2017 | Ervin | |

OTHER PUBLICATIONS

Japanese Office Action dated Apr. 11, 2023 from counterpart JP App No. 2021-524133.

* cited by examiner

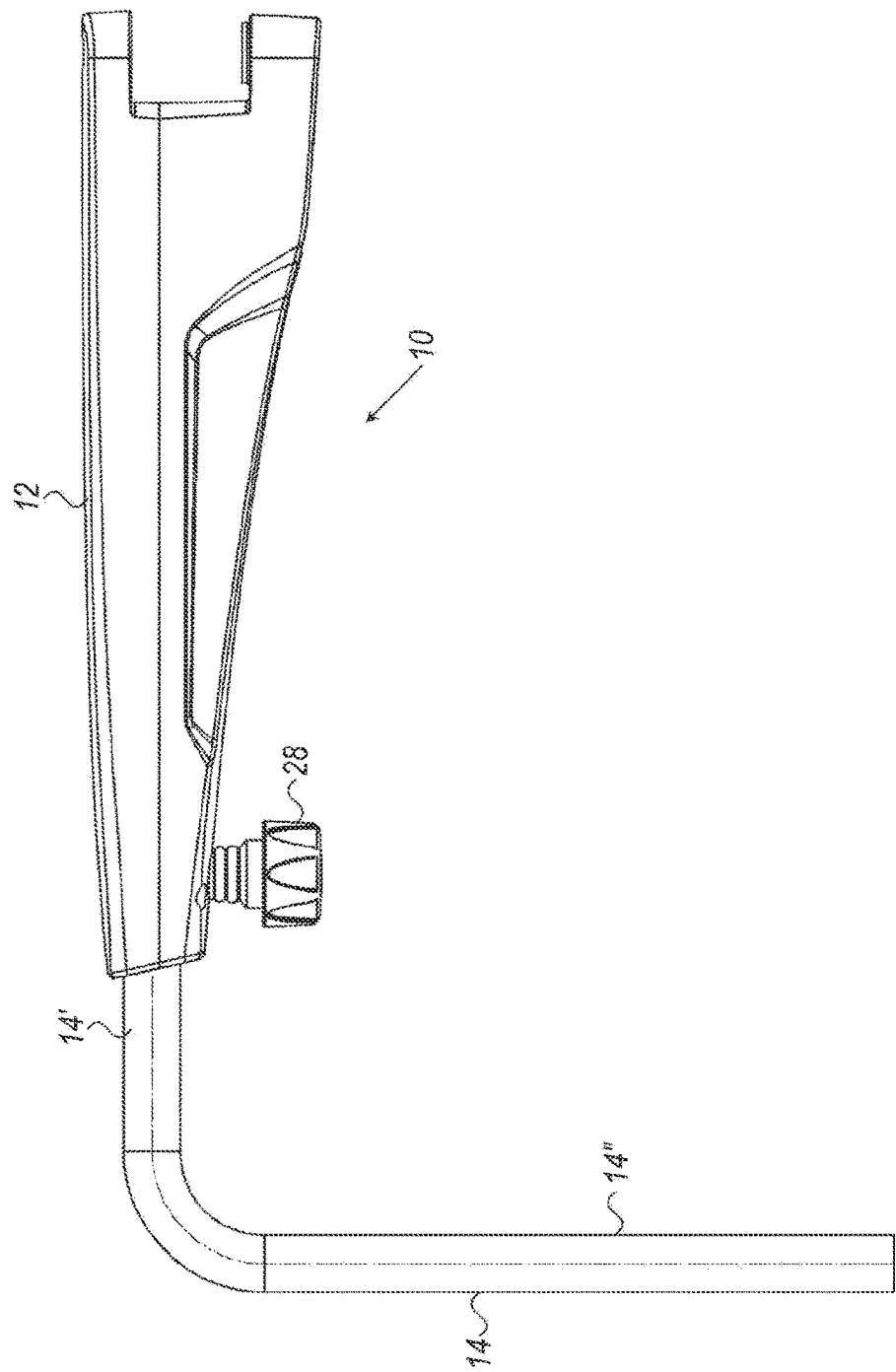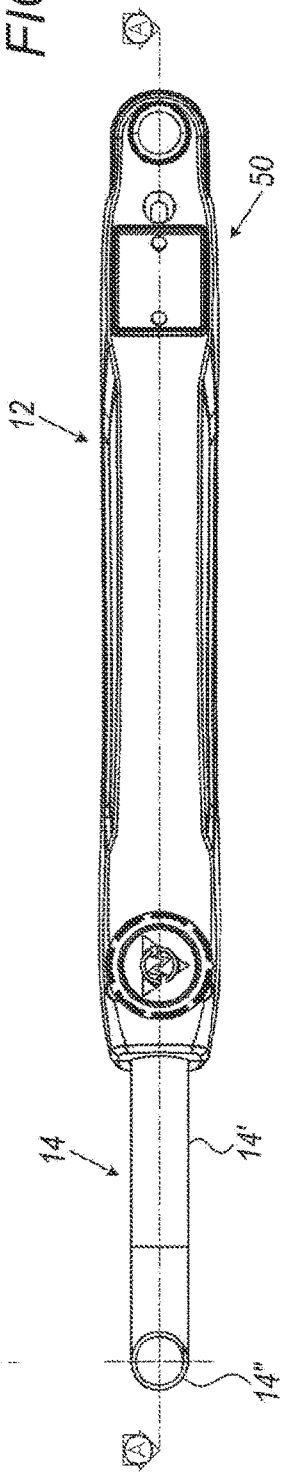

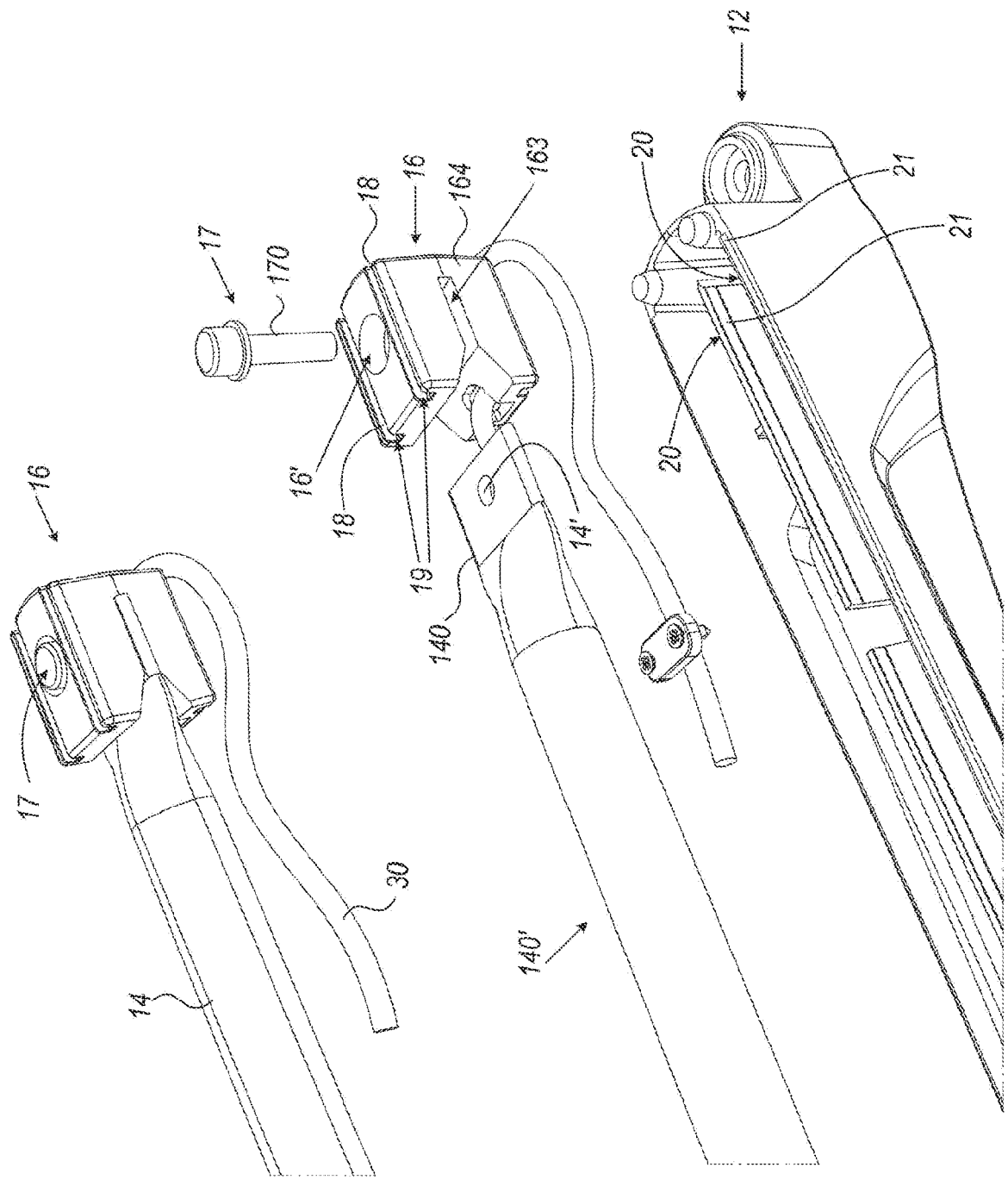

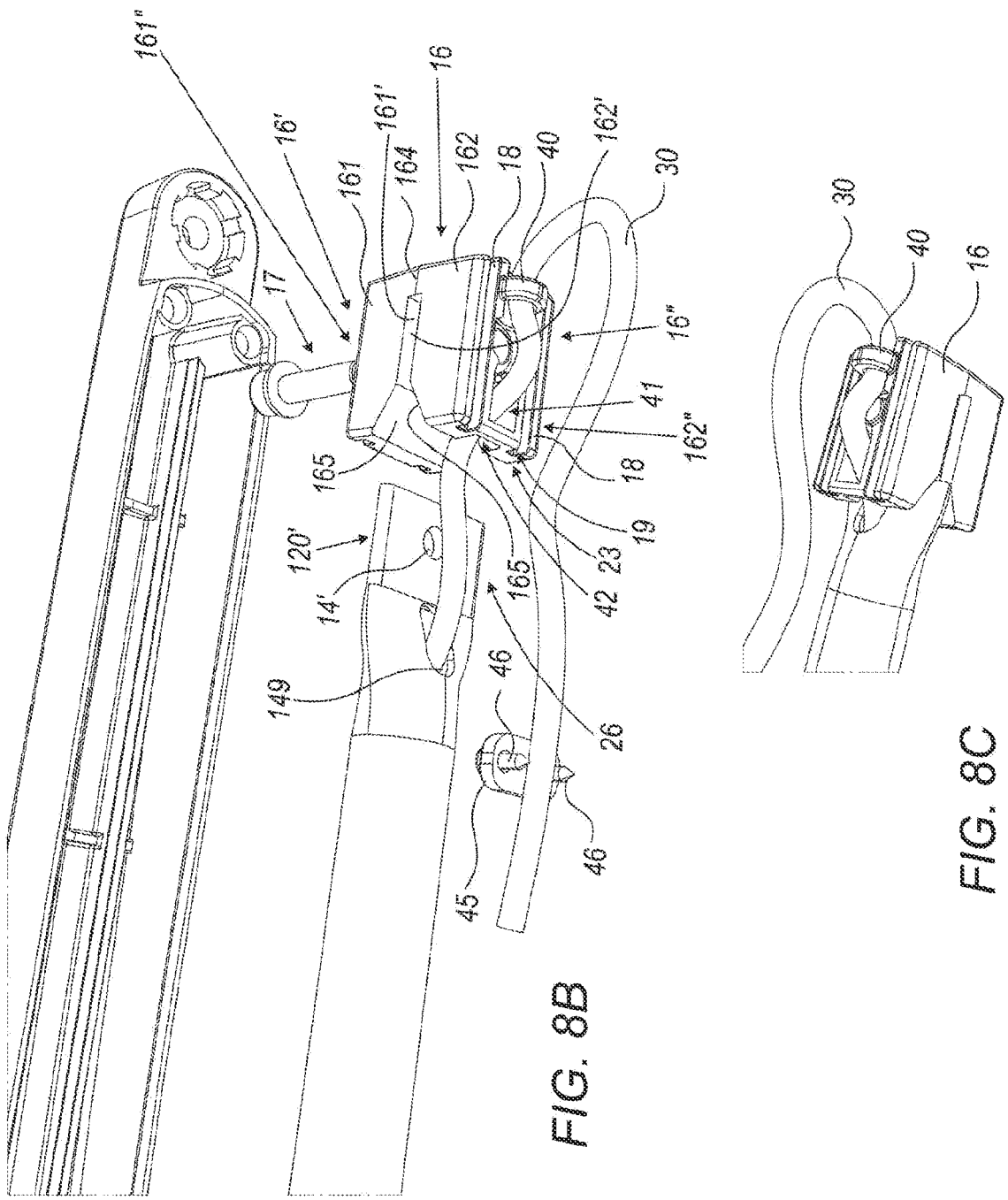

SUPPORT FOR CONNECTING A REAR-VIEW MIRROR TO A CORRESPONDING VEHICLE

This application is the National Phase of International Application PCT/IB2019/051110 filed Feb. 12, 2019 which designated the U.S.

This application claims priority to Italian Patent Application No. 102018000007201 filed Jul. 13, 2018, which application is incorporated by reference herein.

The present invention relates to a support for connecting a rear-view mirror to a corresponding vehicle, preferably used on vehicles suitable for towing a corresponding trailer, or on corresponding agricultural tractors.

PRIOR ART

There are known supports for connecting a rear-view mirror to a corresponding vehicle and which can be used on vehicles suitable for towing a corresponding trailer, or on corresponding agricultural tractors, which comprise means for connecting to said vehicle, means for supporting the rear-view mirror, in particular in the form of a corresponding arm, preferably tubular to which the mirror is hung, and means which are able to connect, in a movable manner, said means for supporting the rear-view mirror to said means for connection to said vehicle, such connecting means are adapted to allow the same means for supporting the mirror to be moved in any position between a respective retracted position, with respect to said means for connecting to the vehicle, to which the rear-view mirror is closest to said vehicle, and a respective extended position, with respect to the same connecting means, in which the same rear-view mirror is furthest from the same vehicle.

A problem experienced in manufacturing rear-view mirrors using supports of the aforementioned type relates to the excessive vibrations of the rear-view mirror when the vehicle is moving or running, especially in the position of maximum extension of the relative support, or maximum distance of the mirror from the vehicle.

These excessive vibrations of the rear-view mirror cause a poor vision of the rear part of the vehicle by the driver of the same vehicle and are therefore quite annoying for the driver, or may even make the vehicle maneuvers dangerous.

Furthermore, in the field it is also felt the need to have a support for rear-view mirrors that allows the mirror to be moved, or extended or retracted, easily, without risk of jamming.

Furthermore, in the field it is also desired to have a support for rear-view mirrors which can be constructed in a very quick and easy way.

SUMMARY OF THE INVENTION

However, with the present invention, a new and/or alternative solution to the solutions known thus far is proposed and in particular it is proposed to remedy one or more of the drawbacks or problems referred to above, and/or to satisfy one or more requirements felt in the art, and in particular inferable from the foregoing.

A support is therefore provided for connecting a rear-view mirror to a corresponding vehicle, preferably usable on vehicles suitable to tow a corresponding trailer, i.e., on corresponding agricultural tractors; 5 comprising connecting means to said vehicle, supporting means of the rear-view mirror, and means that are suitable to movably connect said supporting means of the rear-view mirror to said connecting means to said vehicle, which connecting means are suitable to allow the same mirror supporting means to be moved to any position between a respective retracted position, particularly in which the rear-view mirror is nearest to said vehicle, and a respective extended position, particularly in which the same rear-view mirror is furthest from the same vehicle; characterized in that said connecting means have a plurality of pairs of surfaces for a slidable engagement to corresponding pairs of surfaces of the connecting means to the vehicle.

In this way, it is possible to minimize the presence of clearance between the supporting means of the rear-view mirror and the connecting or fixing means to the vehicle, and the vibrations that the rear-view mirror can exhibit when the vehicle is in motion or in running. This results in a better vision by the driver of the vehicle.

BRIEF DESCRIPTION OF THE DRAWINGS

This and other innovative aspects, or specific advantageous embodiments, are, however, described in the claims below, whose technical features are found in the following detailed description, illustrating preferred and advantageous embodiments, which are however to be considered as merely exemplary and non-limiting of the invention; said description being made with reference to the accompanying drawings, in which:

FIG. 1 shows a schematic elevation side view of a preferred embodiment of a support according to the present invention;

FIG. 2 shows a schematic plan view from below of the preferred embodiment of the support according to the present invention;

FIG. 7B shows a schematic view of an enlarged detail of the exploded perspective of the preferred embodiment of the support according to the present invention;

FIG. 7C shows a schematic view of the enlarged detail of the perspective in FIG. 7B, in an assembled condition;

FIG. 8B shows a schematic view of an enlarged detail of the exploded perspective in FIG. 8A of the preferred embodiment of the support according to the present invention;

FIG. 8C shows a schematic view of the enlarged detail of the perspective in FIG. 8B, in an assembled and overturned condition;

DETAILED DESCRIPTION OF THE PREFERRED EMBODIMENT OF THE INVENTION

Figure 3A:
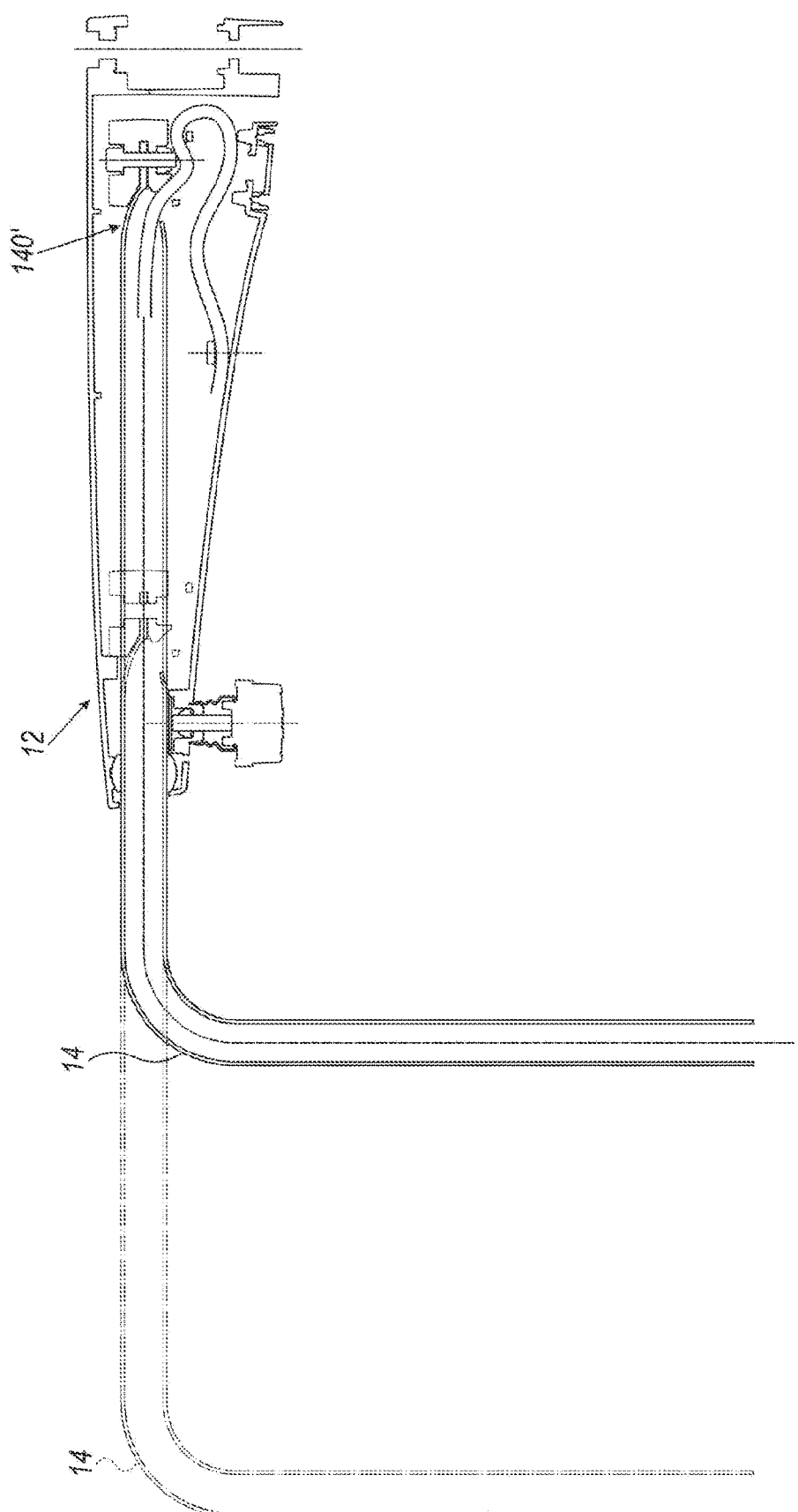
FIG. 3A shows a schematic longitudinal section view of the preferred embodiment of the support according to the present invention, taken along line A-A in FIG. 2, and illustrating the position of the same support in the retracted position and, in dashed lines, in an extended position.
Figure 3B:
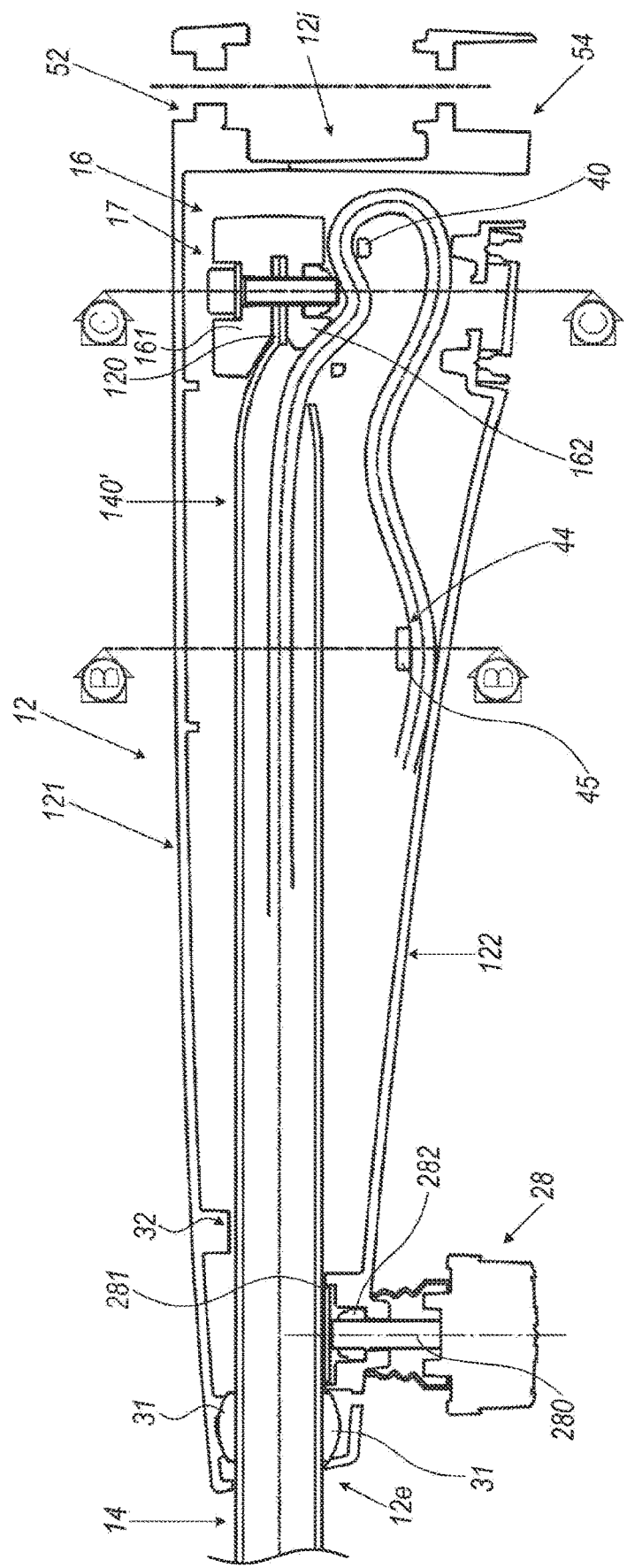
FIG. 3B shows an enlarged schematic longitudinal section view of the preferred embodiment of the support according to the present invention.

The accompanying figures illustrate a preferred embodiment of a support for connecting a rear-view mirror to a corresponding vehicle, which is preferably used on vehicles which are suitable for towing a corresponding trailer or on corresponding agricultural tractors.

As can be seen in the figures, the support 10 comprises means 12 for connecting to said vehicle and means 14 for supporting the rear-view mirror, in particular in the form of a corresponding arm, preferably tubular, to which the mirror is hung.

Said arm 14 is preferably of a respective tubular metal material having a horizontal branch 14', preferably upper in use, as illustrated, for coupling with said connecting means 12, and a perpendicular branch 14", lower in use extending from said horizontal branch, and which directly supports said mirror, the latter being not particularly illustrated in the accompanying figures.

As illustrated, the support 10 further comprises means 16 which are adapted to connect in a movable manner the means 14 for supporting the rear-view mirror to said means 12 for connecting to said vehicle.

As can be seen in FIG. 3A, said connection means 16 are adapted to allow said mirror supporting means 14 to be moved in any position between a respective retracted position with respect to said means 12 for connecting to the vehicle, in particular, in which the rear-view mirror 10 is closest to said vehicle, and a respective extended position, with respect to the same connecting means 12, in particular in which the same rear-view mirror 10 is furthest from the same vehicle.

Figure 4:
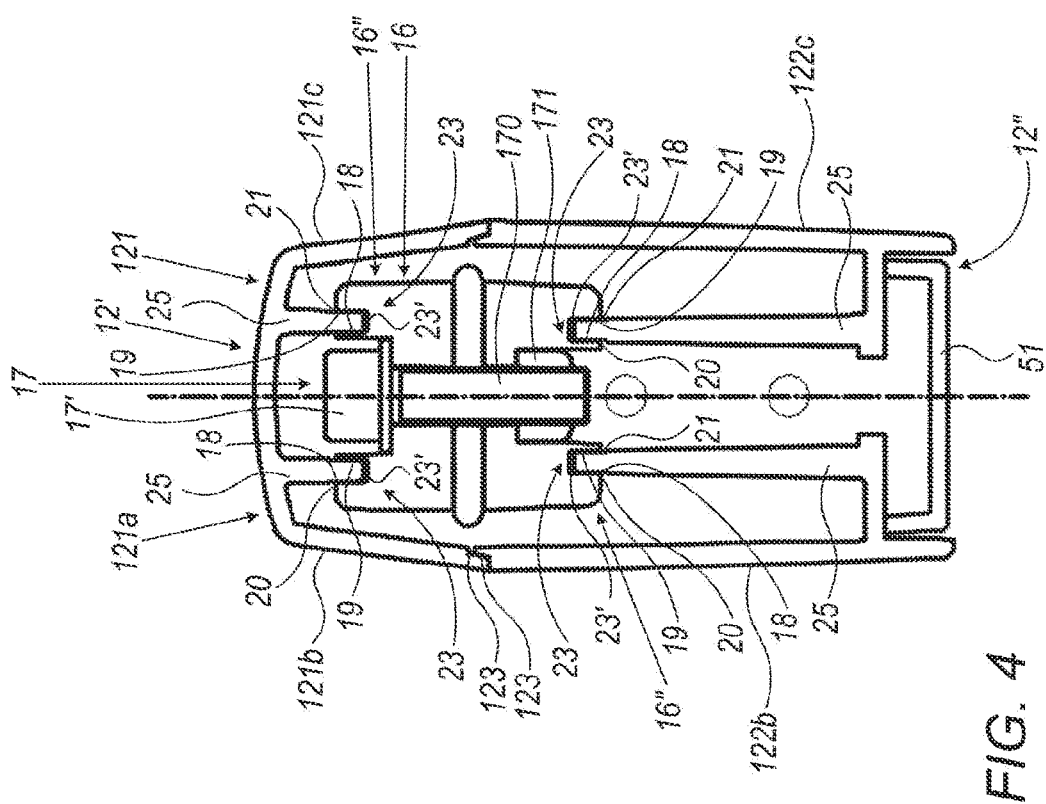
FIG. 4 shows an enlarged schematic cross-sectional view, taken along line C-C in FIG. 3B, of the preferred embodiment of the support according to the present invention.
Figure 6:
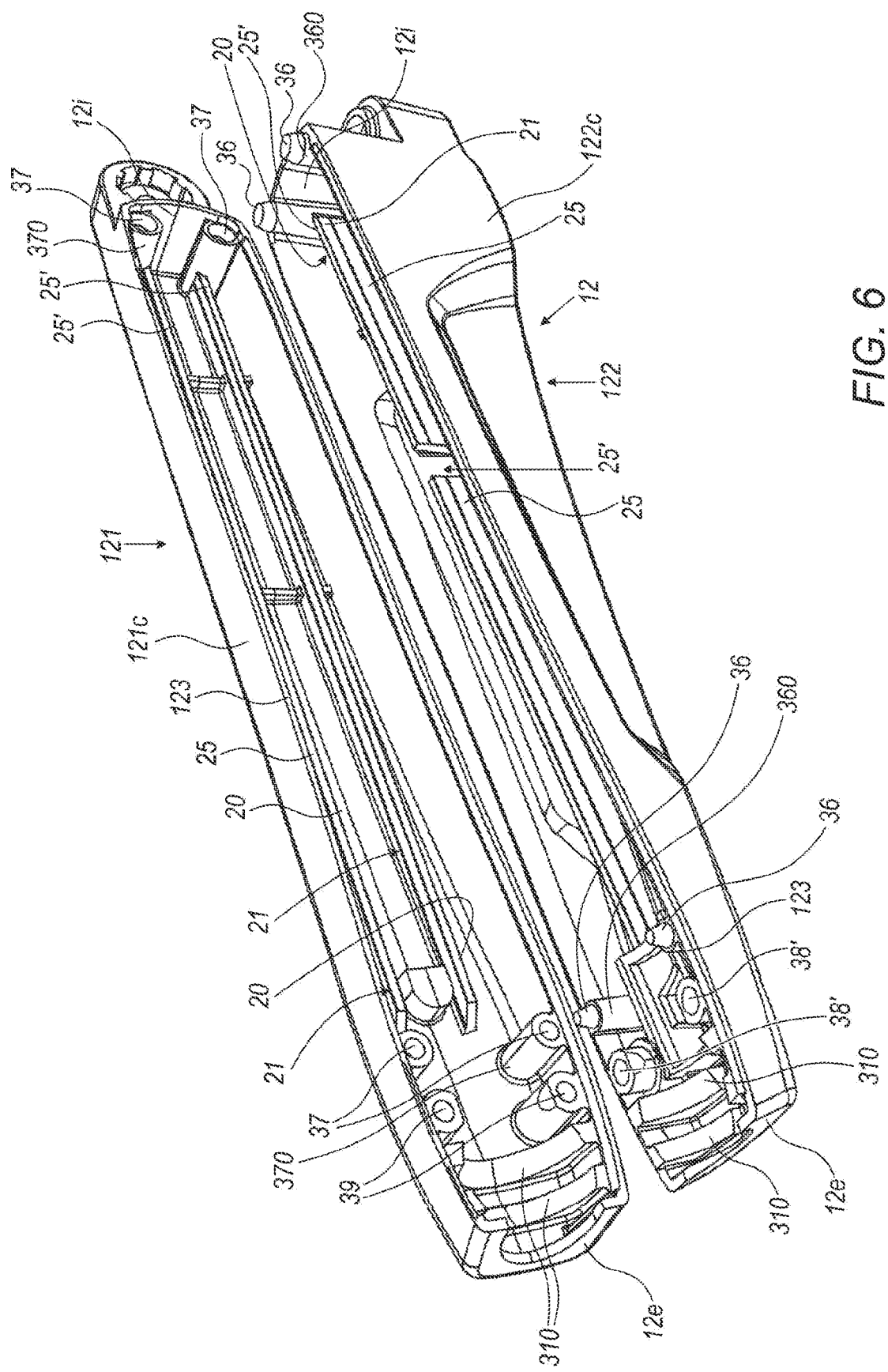
FIG. 6 shows a schematic perspective view of the preferred embodiment of means for connecting to the vehicle of the support according to the present invention, in an open condition.
Figure 7A:
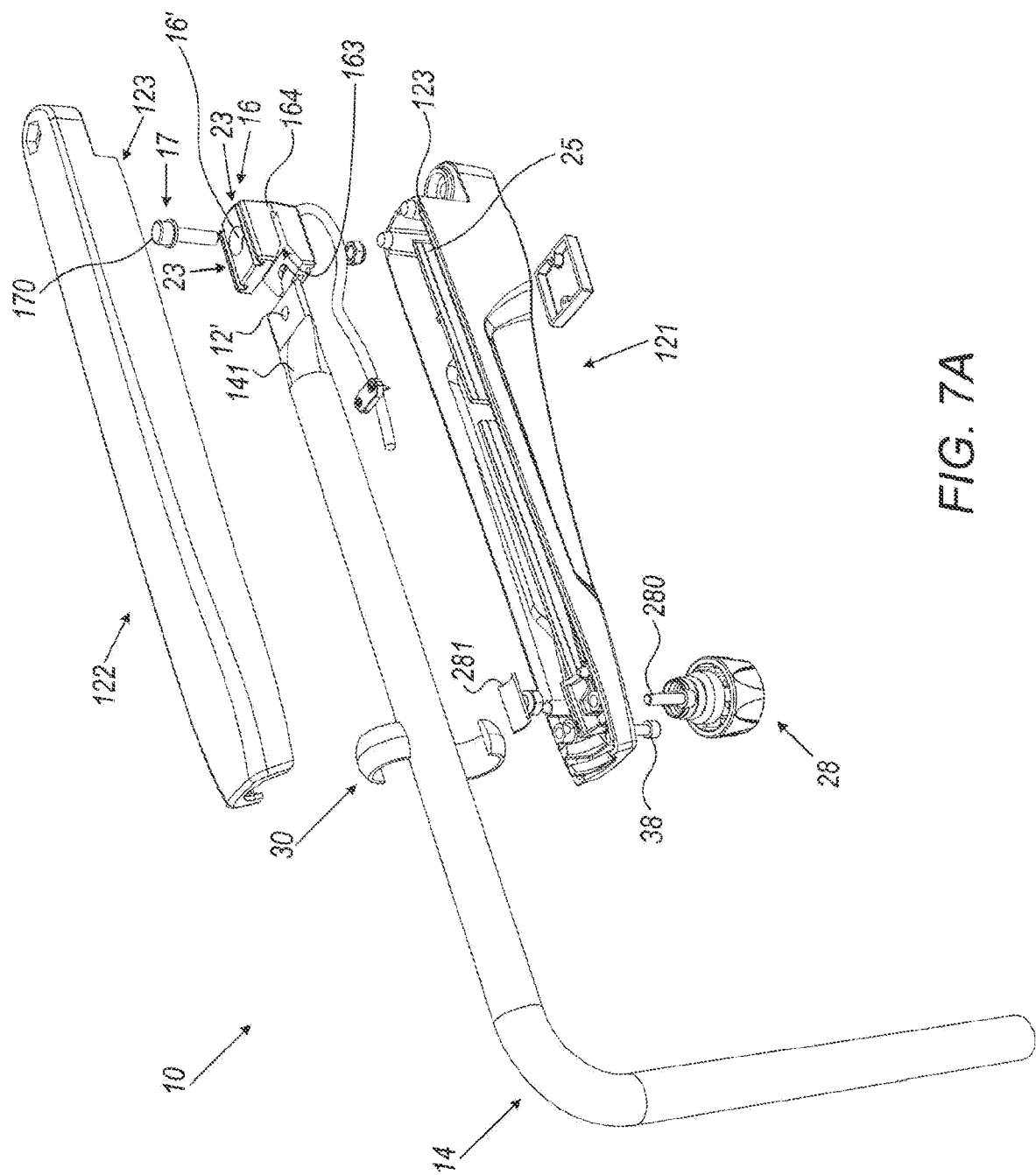
FIG. 7A shows an exploded schematic perspective view of the preferred embodiment of the support according to the present invention.
Figure 8A:
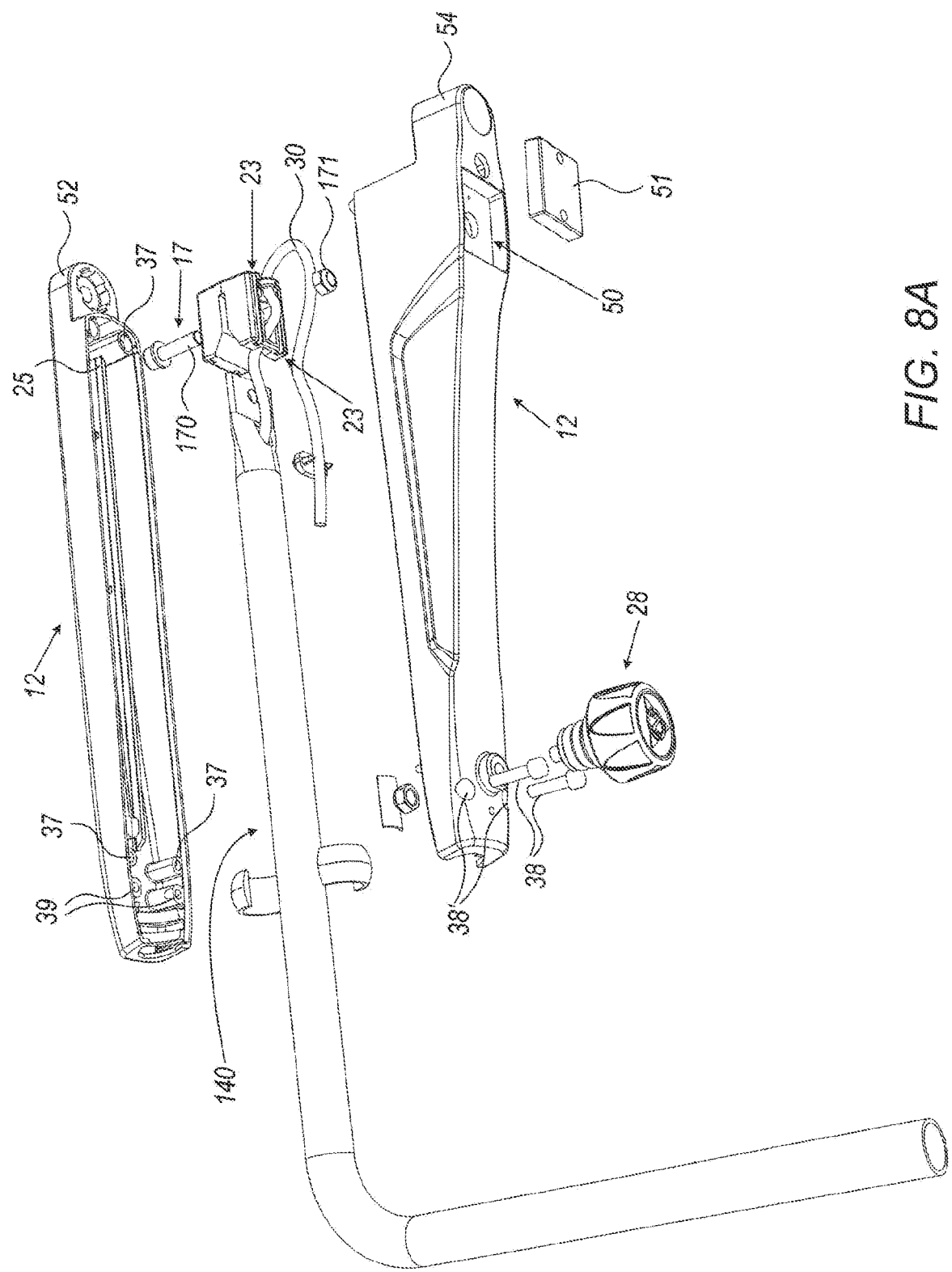
FIG. 8A shows an exploded schematic perspective view of the preferred embodiment of the support according to the present invention, taken from the opposite side to that in FIG. 7A.
Figure 9:
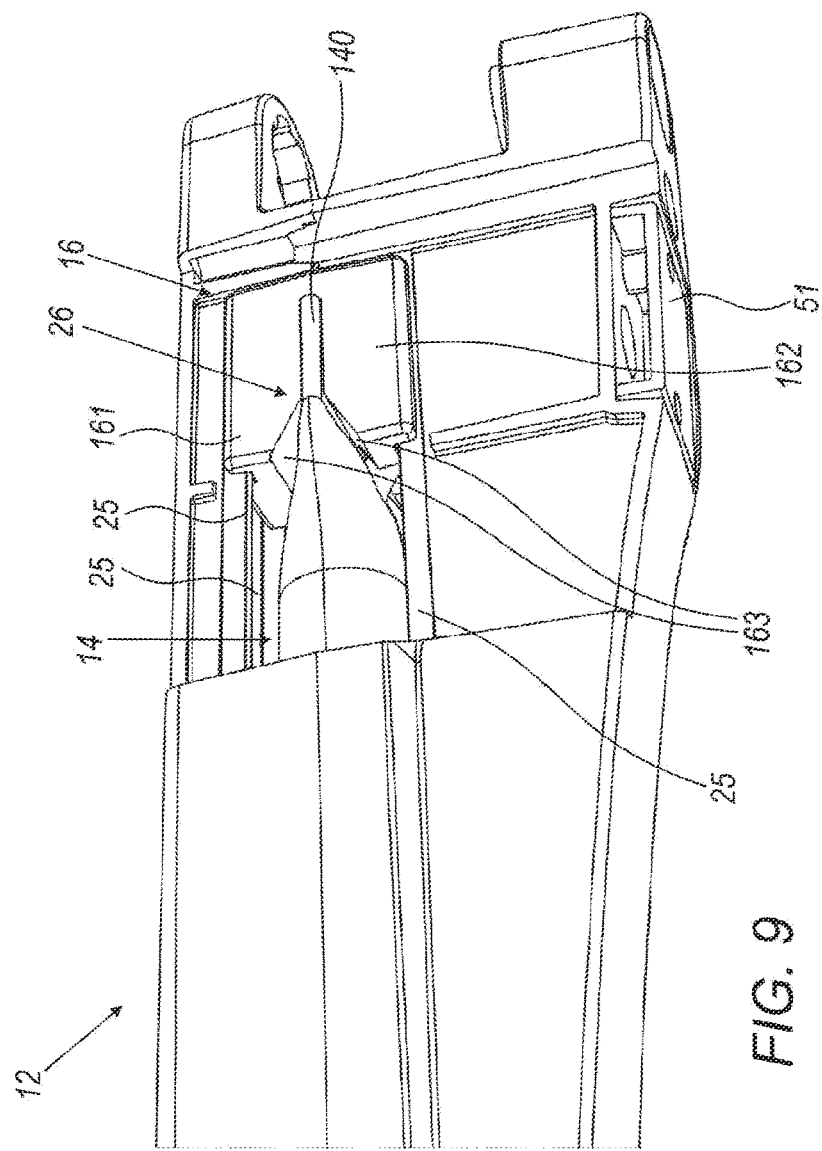
FIG. 9 shows a schematic perspective sectional view of an enlarged detail of the preferred embodiment of the support according to the present invention.

Advantageously, as can be inferred in particular from FIG. 4, said connection means 16 (adjustment device) have a plurality of pairs of engaging and sliding surfaces 18, 19 with corresponding pairs of surfaces 20, 21 of the means 12 for the connection to the vehicle.

In this way, it is possible to minimize the presence of clearance between the supporting means of the rear-view mirror and the connecting or fixing means to the vehicle, and the vibrations that the rear-view mirror can exhibit when the vehicle is in motion or in running. This results in a better vision by the driver of the vehicle.

Advantageously, as shown in the figures, the means 12 for the connection to the vehicle are preferably in the form of a respective arm, having a first part 121, particularly an upper one in use, and a second part 122, particularly a lower one in use, which are mutually opposite and define a respective housing chamber for said connecting means 16 and for a corresponding outermost portion 140' of the mirror supporting means 14.

Figure 5:
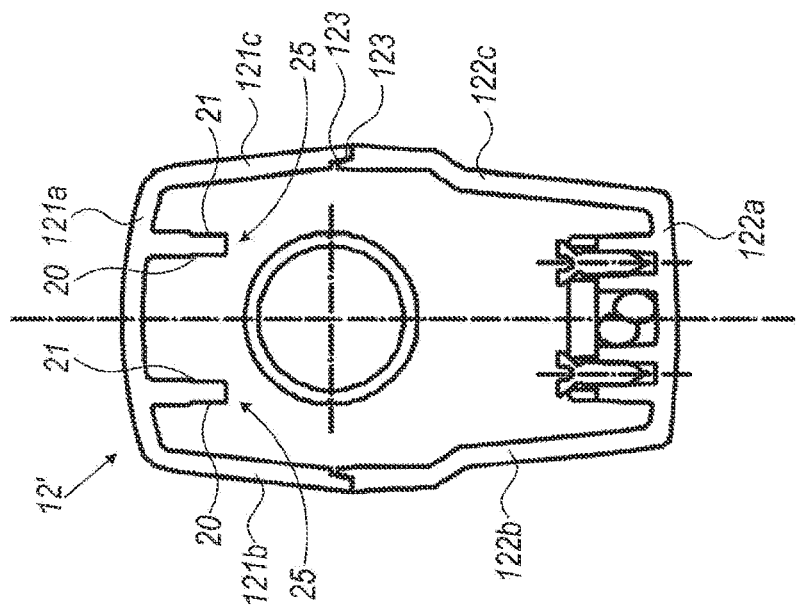
FIG. 5 shows an enlarged schematic cross-sectional view, taken along line B-B in FIG. 3B, of the preferred embodiment of the support according to the present invention.

In particular, as can be seen in particular in FIGS. 4 and 5, the respective part 121, 122 of the arm 12 has a respective bottom wall 121a or 122a, upper and/or lower in use, from which corresponding side walls 121b are extended, 121c or 122b, 122c facing each other at the respective perpendicular or free edges 123.

Advantageously, as shown in the figures, a plurality of pairs of surfaces 18, 19, in particular two pairs of surfaces 18, 19 for a slidable engagement to corresponding pairs of surfaces 20, 21, of the vehicle connecting means 12 are provided for at the upper part or side of said connecting means 16.

Advantageously, as shown in the figures, a plurality of pairs of surfaces 18, 19, in particular two pairs of surfaces 18, 19 for a slidable engagement to corresponding pairs of surfaces 20, 21 of the vehicle connecting means 12 are provided for at the lower side or part of said connecting means 16.

In practice, as can be seen in the figures, a plurality of pairs of surfaces, in particular two pairs of surfaces, 18, 19 for a slidable engagement to corresponding pairs of surfaces 20, 21, of the vehicle connecting means 12 are provided for in a respective half-portion, particularly at a respective side or part, of said connecting means 16.

In practice, as illustrated, two pairs of surfaces 18, 19 are provided, on the side or upper part of the connecting means or body 16, and two pairs of surfaces 18, 19 on the side or bottom of the same connecting means or body 16.

In this way, it is possible to minimize the presence of clearance between 14 the supporting means of the rear-view mirror and the connecting or fixing means 12 to the vehicle, and the vibrations that the rear-view mirror can exhibit when the vehicle is in motion or running. This results in a better vision by the driver of the vehicle.

Advantageously, as can be seen in the figures, the surfaces 18, 19 of each pair of engaging and sliding surfaces on said connecting means 16 are facing according to opposite directions, particularly mutually transversally opposite directions.

Advantageously, as can be seen in the figures, the surfaces 18, 19 of each pair of engaging and sliding surfaces on said connecting means 16 are mutually opposite, particularly mutually transversally opposite.

Advantageously, as can be seen in the figures, the surfaces 20, 21 of each pair of corresponding engaging and sliding surfaces of the vehicle connecting means 12 are facing according to directions, particularly transversal directions, that are mutually opposite and preferably facing corresponding lateral sides of said connecting means to the vehicle 12, and especially being suitable to engage the surfaces 18, 19 of the respective engaging and sliding pair which are mutually opposite.

Advantageously, as can be seen in the figures, in use the surfaces 18, 19 of each pair of engaging and sliding surfaces on said connecting means 16, and/or the corresponding pairs of surfaces 20, 21 of the vehicle connecting means 12, are mutually transversally aligned.

Advantageously, as can be seen in the figures and as mentioned above, on the connecting means 16, two pairs of engaging and sliding surfaces 18, 19 are provided for at the upper part 121 of said connecting means 12.

As can be seen in the figures, therefore, on the connecting means 12 to the vehicle two pairs of corresponding engaging and sliding surfaces 20, 21 are provided for at the lower part 122 of said connecting means 12.

Advantageously, as can be seen in the figures and as mentioned above, on the connecting means 16, two pairs of engaging and sliding surfaces 18, 19 are provided for at the lower part 122 of said connecting means 12.

As can be seen in the figures, therefore, on the connecting means 12 to the vehicle two pairs of corresponding engaging and sliding surfaces 20, 21 are provided for at the lower part 122 of said connecting means 12.

In a particularly advantageous manner, as can be seen in the figures, said connecting means comprise, or consist of, a corresponding shaped body 16, preferably made of plastic material, in particular having a general prismatic shape.

Advantageously, as can be seen in the figures, in order to connect said connecting means 12 to said vehicle and said supporting means 14 of the rear-view mirror, a plurality of receiving seats 23 for corresponding projections 25 are provided for.

Advantageously, as can be seen in the figures, said receiving seats 23 are provided in said shaped connecting body 16 and said projections being provided on said means, or arm, 12 for the connection to the vehicle, in particular on said first 121 and second 122 parts thereof.

Advantageously, as can be seen in the figures, a plurality of receiving seats, particularly two receiving seats 23, for corresponding projections 25 is provided for at a respective side, or part, particularly an upper 16' and/or lower 16" side, of said connecting means, or body 16.

Advantageously, as shown in the figures, a plurality of projections, in particular two projections, 25 extend from the respective side, in particular upper 12' and/or lower 12", of said means 12 for the connection to the vehicle, or from the respective upper 121 or lower 122 part.

Advantageously, as can be seen in the figures, the respective projection 25 or the respective pair of projections 25, 25 extends, particularly perpendicularly, from the bottom wall 121a or 122a of the respective upper 121 or lower 122 part of said connecting means 12 to the vehicle.

Advantageously, as can be seen in the figures, the respective projection 25 or the respective pair of projections 25, 25 extends longitudinally by a prevailing part of the length of said connecting means 12 to the vehicle, i.e., by the respective part 121 or 122 of said connecting means 12 to the vehicle, particularly by a length greater than half the length of said connecting means 12 to the vehicle, i.e., by the respective part 121 or 122 of said connecting means 12 to the vehicle.

In practice, the respective seat 23 comprises contrasting surfaces, in particular laterally opposed to each other, 18, 19 of sliding engagement with corresponding surfaces, in particular lateral surfaces, 20, 21 of the corresponding projection 25.

As illustrated, said surfaces 20, 21 of the corresponding sliding projection 25 are provided at a respective end portion, or the free end, of the same projection 25.

The respective seat 23 also has a respective bottom wall 23', from which said opposed sliding engagement surfaces 18, 19 extend, preferably perpendicularly, and for the possible sliding engagement for the end edge 25' of the respective projection 25.

Advantageously, as can be seen in the figures, stationary securing means 26 of said means, or body, of connection 16 to said means for supporting the mirror 14 are provided.

In this way, it is possible to further minimize the presence of clearance and the vibrations that the rear-view mirror can exhibit when the vehicle is in motion or running are significantly reduced. This results in a better vision by the driver of the vehicle.

Advantageously, as can be seen in the figures, said stationary securing means 26 comprise respective wing shaped means 140 which insert into corresponding grasping means 161, 162.

Advantageously, as can be seen in the figures, said wing-shaped means comprise a respective enlarged wing 140, which extends from the free end of said rear-view mirror supporting means 14.

In particular, as illustrated, in use, said fixing wing 140 is arranged horizontally or substantially horizontally.

Advantageously, as can be seen in the figures, said grasping means comprise a first and a second opposite portions 161, 162 of said connecting means, or body, 16, such portions 161, 162 are suitable to receive and clamp, therebetween, said wing shaped means 140 which extend from said rear-view mirror supporting means 14.

Advantageously, as can be seen in the figures, means 17 are provided for engaging said means, or body, for the connection 16 to said means 14 for supporting the rear-view mirror.

Preferably, as can be seen in the figures, said hooking means of said connecting means, or body, 16 to said rear-view mirror supporting means 14 comprise a corresponding stem 170, in particular the stem of a corresponding screw 17, with enlarged head 17', which is stopped by a corresponding nut 171 which inserts into corresponding holes 14', 16' provided for in said rear-view mirror supporting means 14 and in said connecting means, or body, 16.

In particular, a corresponding hole 16' is provided in the respective grasping portion 161 or 162 of said connecting means, or body, 16 and a corresponding hole 14' is provided in the wing-shaped portion 140 of said supporting means 14 of the rear-view mirror.

Advantageously, as can be seen in the figures, clamping means of said first and second opposite portions 161, 162, of said connecting means, or body, 16 against the corresponding wing 140 extending from said rear-view mirror supporting means 14 are provided for.

In particular, as can be seen in the figures, said hooking means 17 define clamping means of said first and second opposite portions 161, 162, of said connecting means, or body, 16, against the corresponding wing 140 extending from said rear-view mirror supporting means 14.

In a further advantageous manner, as can be seen in the figures, said insertion wing 140 is defined by an end flattened portion of said mirror supporting means 14.

In practice, as can be seen in the figures, said connecting means or body 16 have a first and a second portion 161, 162 defining a respective slot 163 therebetween for receiving the respective wing 120.

As can be seen in the figures, said first and second portions 161, 162 of said connecting means, or body 16, are connected to each other through a connecting portion 164, in particular from which said first and second portions 161, 162 extend cantilever, and which allows said first and second portions 161, 162 to be close to each other, in particular in a bending manner or by elastic yielding, to engage, with the corresponding surfaces 161', 162', the opposed faces 120', 120" of the corresponding inserted wing or end portion of said mirror supporting means 14.

Advantageously, as can be seen in the figures, said connecting means, or body 16, have a first and a second opposite outer faces 161", 162" at which respective surfaces 18, 19 are provided which are provided with the same means of connection 16 for the sliding engagement of said connecting means to said vehicle 12, or the corresponding receiving seats 23 for corresponding projections 25 of said connecting means to said vehicle 12.

Said opposite outer faces 161", 162" being preferably parallel to said inner surfaces 161', 162' of said first and second portions 161, 162 of said connecting means, or body, 16 which are for the engagement of the corresponding wing or end insertion portion 140 of said mirror supporting means 14.

Advantageously, as can be seen in the figures, said first and second grasping portions 161, 162 have mutually opposite outermost surfaces 165, 165 which diverge one from the other to house a corresponding convergent portion of said connecting means, or body, 16, which supports, or is upstream, of said outermost insertion portion or wing.

Advantageously, as shown in the figures, there are also provided means 28 for blocking, in the respective operative position, said mirror supporting means, or arm, 14 with respect to said connecting means to said vehicle 12, in particular blocking means 28 being provided near the free end of said means 12 for the connection to said vehicle Advantageously, as can be seen in the figures, said blocking means of said mirror supporting means, or arm, 14 are engageable on the same mirror supporting means, or arm, 14 in order to block them in the respective operative position and disengageable therefrom in order to unlock them and allow the same mirror supporting means, or arm, 14 a free sliding with respect to the connecting means to the vehicle 12.

Advantageously, as can be seen in the figures, said blocking means, of said mirror supporting means, or arm 14 with respect to said connecting means to said vehicle 12, comprise respective actuating means, particularly in the form of a handle 28, which are supported, in particular in a freely screwable and unscrewable manner, by said connecting means to said vehicle 12 and which are actuatable, particularly manually, in an action of engagement, or locking of said mirror supporting means, or arm, 14 and respectively in an action of disengagement and unlocking of the same mirror supporting means, or arm, 14.

Advantageously, as can be seen in the figures, said actuating means, or handle, 28, have a respective stalk 28 which engages, i.e. the free end of which engages, preferably with a movement in a perpendicular direction, a corresponding shaped and elongated plate 281, particularly arched shaped, for the engagement, in turn, of said rear-view mirror supporting means 14 and the distribution of the stress thereupon.

In particular, said shaped plate 281 is housed inside said means for the connection to said vehicle 12, especially in the lower part 121 thereof, and has a respective hollow sleeve 282, particularly perpendicularly extended with respect to said plate 281, which is suitable for receiving the said engagement stem 280.

Advantageously, as can be seen in the figures, means 31 for the sliding of said rear-view mirror supporting means 14 with respect to said connecting means to said vehicle 12, particularly located at the free end of said connecting means 12 to said vehicle 28 are provided for, and especially downstream of said means of engagement in a locking action of said rear-view mirror supporting means 14.

Said sliding means 31 are provided in proximity to the end wall 12*e* of said means for the connection to said vehicle 12, or to the perforated wall 12 and outwardly of said means for supporting the rear-view mirror 14, which is opposite the transverse wall 12*i* on the other side of the same means for the connection to said vehicle 12.

In particular, as can be seen in the figures, said means 31 for sliding said supporting means of the rear-view mirror 14 with respect to said means for the connection to said vehicle 12 comprise a first and a second semi-members or half-rings 31, 31, which peripherally engage said means, or body, for the connection 16 on opposite sides 16.

Said first and second part 121, 122 of said means for the connection to said vehicle 12 has corresponding shaped seats 310, in particular semi-annular, for resting corresponding semi-members or half-rings 31, 31, in particular said shaped seats 310 being provided downstream of the area provided for said means 28 for blocking said means, or arm, for supporting the mirror 14 to said means for the connection to said vehicle 12.

Advantageously, as can be seen in the figures, there are provided means 36, 37, 38, 39 for connecting said first 121 and second part 122 of said means for the connection to said vehicle Advantageously, as can be seen in the figures, said attachment means between said first 121 and second 122 parts of said connecting means to said vehicle 12 comprise corresponding little pin-shaped means 36, particularly of a conical shape, which insert in corresponding housings 37; particularly said little pin-shaped means 36 and/or said housings 37 being provided for at the end of corresponding column-shaped members 360, 370 extending from the corresponding part 121 and/or 122 of said connecting means to said vehicle 12, especially from the bottom wall 121*a*, 122*a* of the respective part 121 and/or 122 of said connecting means to said vehicle 12.

In particular, as illustrated, a pair of little pin-shaped means 36, 36 is provided, which are inserted into a corresponding pair of housings 37, 37 which are at one end, in particular upstream, of said means of connection to said vehicle 12.

A second pair of little pin-shaped means 36, 36 is also provided which are inserted into a corresponding pair of housings 37, 37, and which are in the vicinity of the opposite end, or downstream end, of said means for the connection to said vehicle 12, in particular by arranging at, or laterally, to said blocking means 28, in the respective working position, of said means, or arm, for supporting the mirror 14.

In this way, said first 121 and second part 122 of said means for the connection to said vehicle 12 can be joined together in a particularly easy and quick manner.

Advantageously, as shown in the figures, said connection means between said first 121 and second part 122 of said connecting means further comprise screw joining means 38, in particular in the form of a first and a second screws 38, 38, which are inserted into corresponding through holes 38', 38' of a respective part 122 of said means for the connection to said vehicle 12 and which screw into corresponding threaded holes 39, 39 at the other part 121 of said means for the connection to said vehicle 12.

Preferably, said through and threaded holes 38', 39 are provided at, or in proximity, of the blocking means 28, in the respective working position, of said means, or arm, for supporting the mirror 14, preferably laterally to these, and/or in particular downstream of the corresponding pins and attachment housings 36 and 37.

Advantageously, as can be seen in the figures, said longitudinal projections 25 for the sliding of said connecting means, or body, 16, which are provided for on the respective part 121 and/or 122 of said connecting means to said vehicle 12, extend longitudinally starting from the columns 360, 370 for the attachment means at an end, particularly upstream, of said connecting means to said vehicle 12, up to near the columns 360, 370 for the attachment means at the other end, particularly downstream, of the same connecting means to said vehicle 12.

Advantageously, as can be seen in the figures, means 32 and/or 34 for stopping the stroke of said connecting means 16 in the respective operative position, particularly in the retracted position, are provided for, particularly in which the rear-view mirror 10 is nearest to said vehicle, and/or in the extended position, particularly in which the same rear-view mirror 10 is farthest from the same vehicle Advantageously, as can be seen in the figures, said means 32 and/or 34 for stopping the stroke of said connecting means 16 in the respective operative position are provided for on said connecting means to said vehicle 12, particularly on the upper part 121 and/or the lower part 122 thereof.

Advantageously, as can be seen in the figures, said means for stopping the stroke of said connecting means 16, in particular in the respective extended working position of said supporting means of the rear-view mirror 14, are defined by a corresponding engaging block 32, which is preferably provided projecting from said upper part 121 of said connecting means to said vehicle 12, in particular from the bottom wall 121a thereof, and which extends between said sliding engagement projections 25 for said means, or body, of connection 16.

Preferably, said engagement block 32 is located upstream of said means 31 for sliding said supporting means of the rear-view mirror 14 with respect to said means for the connection to said vehicle 12 and/or said means for blocking said means, or arm, for supporting the mirror 14, or said means 36, 37, 38, 39 for connecting said first 121 and second 122 parts of said means for the connection to said vehicle 12, and which are at the free end thereof.

Advantageously, as can be seen in the figures, said means for stopping the stroke of said connecting means 16 in the respective retracted operative position are defined by one or more corresponding columns 360 or 370 for corresponding attachment means 36 and/or 37 between said first 121 and second 122 parts of said connecting means to said vehicle 12 and that arranged at an end, particularly upstream, of said connecting means to said vehicle 12.

Advantageously, as shown in the figures, there are provided means for supplying an electric current, in particular in the form of a respective electric cable 30.

In this way, it is possible to supply an advantageous electric current, in particular for powering the mirror heating means, which allow preventing the misting of the mirror, or for corresponding lighting means which may be supported by the present support.

Advantageously, as can be seen in the figures, said connecting means, or body 16 have holding means 40 for said electrical supply means, or cable 30.

In this way, said electric supply means, or cable, 30 can be moved, that is, extended or retracted, easily, without risk of jamming, along with the movement of said means for supporting the rear-view mirror.

Advantageously, as can be seen in the figures, said holding means of said electrical supply means, or cable, 30 extend at a corresponding face, particularly a lower one in use, of said connecting means, or body, 16 and, preferably, comprise a corresponding ring-shaped member 40 for inserting and holding said electrical supply cable 30.

Advantageously, as can be seen in the figures, said connecting means, or body, 16 comprise a corresponding storage seat or channel 41 of said electrical supply means, or cable, 30; such storage seat or channel 41 is at a corresponding face, particularly a lower one in use, of said connecting means, or body, 16 and opens in a corresponding through hole 42 of said electrical supply cable 30 which, preferably, is at or opposite, in use, a corresponding hole 149 that is provided for on said mirror supporting means, or arm, 14, particularly on an inclined face thereof, and through which hole 149 said cable passes into said mirror supporting means, or arm, 14.

As shown, said storage seat or channel 41 is located between corresponding slidable engagement longitudinal seats 23 which are provided on the respective face, in particular lower in use, of said connecting means, or body 16.

Advantageously, as can be seen in the figures, stopping means (44) for the electrical supply means, or cable 30 on the means 12 for the connection to said vehicle, particularly at the lower part 122 thereof are provided for, which stopping means 44 are preferably provided for between the outermost, particularly longitudinally opposite, positions which said connecting means, or body, 16 take at said retracted and extended positions, respectively, of said rear-view mirror supporting means 14.

Advantageously, as can be seen in the figures, said stopping means 44 of the electrical supply means, or cable 30 on the means 12 for the connection to said vehicle comprise a member, or small plate, 45 for the engagement and clamping of the same electrical supply means, or cable 30 against said connecting means to said vehicle 12, i.e., against a wall, particularly a bottom or lower wall, 122a of the respective part, particularly the lower part, 122 of the same connecting means to said vehicle 12.

As illustrated, screw means are provided, i.e. in the form of a first and second screws 46, 46 which clamp the member, or small plate, 45 for the engagement and clamping of the same electrical supply means, or cable 30 towards and against said connecting means to said vehicle 12, i.e., against the wall, particularly a bottom or lower wall, 122a of the respective part, particularly the lower part, 122 of the same connecting means to said vehicle 12.

Advantageously, as can be seen in the figures, said member, or small plate, (45) for the engagement and clamping of the same electrical supply means, or cable (30) extends, particularly transversally, inserting at least in a corresponding split (25'), provided for in a corresponding longitudinal projection (25), i.e., in corresponding splits 25' provided for in both the adjacent longitudinal sliding projections (25, 25) for said connecting means, or body, (16), the respective protrusion is especially provided on the respective part, in particular lower 122, of said means for the connection to said vehicle In particular, said connecting means, or body 16, have a longitudinal length which is greater than the longitudinal extension of the respective split 25', thereby allowing said splits to be easily crossed without jamming, by the same connection means or body 16, while these move along the respective projection.

Advantageously, as can be seen in the figures, means 50 are provided for the provision of corresponding lighting means.

Advantageously, as can be seen in the figures, said means 50 for setting up corresponding lighting means are in the form of a recess 50, which is suitable to house corresponding lighting means, and which is provided for on said connecting means to said vehicle 12, particularly on the respective part, particularly the lower part 122, of the same connecting means to said vehicle 12, preferably such a recess 50, when not used, is closed by a corresponding small lid 51.

As can be seen in the figures, said connecting means to the vehicle 12 comprise means 52, 54 for securing, particularly securing by a hinge, preferably directly to the vehicle.

In particular, said connecting means to said vehicle 12 define a corresponding hinge-shaped joint, preferably of rotation about a vertical axis. In particular, a through hole is provided at the upper part of the arm 12 for the connection to the vehicle and a corresponding through hole at the lower part of the same arm 12 for the connection to the vehicle.

Advantageously, as can be seen in the figures, said connecting means to the vehicle 12 comprise means projecting from the end, particularly upstream, of the same connecting means to said vehicle 12, and especially comprise a first and a second portions 52, 54 projecting from the outermost wall 12i of the respective upper and lower parts 121, 122 of said connecting means to said vehicle 12, which projecting means, or portions, 52, 54 comprise a corresponding hinging through, preferably for hinging directly to the vehicle.

Advantageously, as illustrated, said means, or recesses, 50 for the provision of corresponding lighting means are in proximity of one end of the same means for the connection to said vehicle 12.

Moreover, as illustrated, said means, or recesses, 50 have a respective bottom in which a hole is provided for the passage of a corresponding electrical supply cable.

In practice, as is clear, the above illustrated technical features allow, individually or in a respective combination, to achieve at least one or more of the following advantageous results:
- it is possible to minimize the presence of clearance between the supporting means of the rear-view mirror and the fixing means, and the vibrations that the rear-view mirror can exhibit when the vehicle is in motion or running, resulting in a better vision from the driver of the vehicle;
- the support can be mounted quickly and easily;
- the mirror can be moved, or extended or retracted, easily, without risk of jamming.

The present invention is susceptible of evident industrial application. The man skilled in the art may also envisage numerous modifications and/or variations to be made to the same invention, while remaining within the scope of the inventive concept, as widely explained. Furthermore, the man skilled in the art can envisage further preferred embodiments of the invention which comprise one or more of the above illustrated features of the preferred embodiment. Furthermore, it must also be understood that all the details of the invention can be replaced by technically equivalent elements.

The invention claimed is:

1. A support for connecting a rear-view mirror to a corresponding vehicle, comprising:
    a connecting device configured to connect to said vehicle;
    a supporting device configured to support the rear-view mirror;
    an adjustment device configured to movably connect the supporting device to the connecting device;
    the adjustment device being suitable to allow the supporting device to be moved to any position between a respective retracted position, in which the rear-view mirror is nearest to said vehicle, and a respective extended position, in which the rear-view mirror is furthest from the vehicle;
    wherein said adjustment device includes a plurality of pairs of surfaces for a slidable engagement to corresponding pairs of surfaces of the connecting device;
    wherein the connecting device includes a respective arm, having an upper first part, and a lower second part, which are mutually opposite and define a respective housing chamber for said adjustment device and for a corresponding outermost portion of the supporting device;
    wherein the plurality of pairs of surfaces are configured in a respective half-portion, at a respective upper or lower side, of said adjustment device;
    wherein the surfaces of each pair of the plurality of pairs of surfaces face mutually transversally opposite directions;
    wherein the surfaces of each pair of the plurality of pairs of surfaces are mutually transversally opposite;
    wherein at least one chosen from the surfaces of each pair of the plurality of pairs of surfaces the corresponding pairs of surfaces are mutually transversally aligned;
    wherein the surfaces of each pair of the corresponding pairs of surfaces face according to transversal directions, that are mutually opposite and face corresponding lateral sides of said connecting device; and are suitable to engage the surfaces of the respective pair of the plurality of pairs of surfaces which are mutually opposite;
    wherein, the adjustment device includes two pairs of the plurality of pairs of surfaces at the upper first part of said connecting device; and the connecting device includes two pairs of the corresponding pairs of surfaces at the upper first part of said connecting device to respectively engage the two pairs of the plurality of pairs of surfaces at the upper first part of said connecting device;
    wherein, the adjustment device includes two pairs of the plurality of pairs of surfaces at the lower second part of said connecting device and the connecting device includes two pairs of the corresponding pairs of surfaces at the lower second part of said connecting device to respectively engage the two pairs of the plurality of pairs of surfaces at the lower second part of said connecting device.

2. The support according to claim 1, wherein said adjustment device comprises or is composed of, a corresponding shaped body, of a plastic material, and having a general prismatic shape.

3. The support according to claim 1, and further comprising a plurality of receiving seats configured to receive corresponding projections to connect said connecting device and said supporting device.

4. The support according to claim 3, wherein said plurality of receiving seats are positioned in a shaped body of the adjustment device and said projections are positioned on said connecting device.

5. The support according to claim 3, wherein at least two of the plurality of receiving seats for corresponding projections are positioned at a respective side of the adjustment device.

6. The support according to claim 3, wherein each of the plurality of receiving seats comprises opposite surfaces for a slidable engagement to corresponding surfaces of the corresponding projection.

7. The support according to claim 3, wherein at least two of the plurality of projections extend from a respective side of the connecting device.

8. The support according to claim 3, wherein a respective one of the projections extends perpendicularly, from a bottom wall of the upper first part or lower second part of said connecting device.

* * * * *